United States Patent
Ishizaki

(10) Patent No.: US 9,542,190 B2
(45) Date of Patent: Jan. 10, 2017

(54) PROCESSOR WITH FETCH CONTROL FOR STOPPAGE

(75) Inventor: Masakatsu Ishizaki, Kawasaki (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 329 days.

(21) Appl. No.: 14/378,609

(22) PCT Filed: Feb. 14, 2012

(86) PCT No.: PCT/JP2012/053347
§ 371 (c)(1),
(2), (4) Date: Aug. 13, 2014

(87) PCT Pub. No.: WO2013/121516
PCT Pub. Date: Aug. 22, 2013

(65) Prior Publication Data
US 2015/0058600 A1    Feb. 26, 2015

(51) Int. Cl.
*G06F 9/38* (2006.01)
*G06F 12/08* (2016.01)
*G06F 9/30* (2006.01)

(52) U.S. Cl.
CPC ......... *G06F 9/3804* (2013.01); *G06F 9/30058* (2013.01); *G06F 12/0862* (2013.01); *G06F 12/0875* (2013.01); *G06F 12/0884* (2013.01); *G06F 12/0888* (2013.01); *G06F 2212/1028* (2013.01); *G06F 2212/452* (2013.01); *Y02B 60/1225* (2013.01)

(58) Field of Classification Search
None
See application file for complete search history.

(56) References Cited

U.S. PATENT DOCUMENTS

| | | |
|---|---|---|
| 5,325,508 A | 6/1994 | Parks et al. |
| 2006/0174090 A1 | 8/2006 | Sartorius et al. |

FOREIGN PATENT DOCUMENTS

| | | |
|---|---|---|
| EP | 0633522 A1 | 1/1995 |
| JP | 4-233642 A | 8/1992 |
| JP | 5-27972 A | 2/1993 |

(Continued)

OTHER PUBLICATIONS

Chinese Office Action dated May 31, 2016 issued in Chinese Patent Application No. 201280069647.9 (English translation).

(Continued)

*Primary Examiner* — William B Partridge
(74) *Attorney, Agent, or Firm* — McDermott Will & Emery LLP

(57) ABSTRACT

A data processor of an embodiment includes a memory, an instruction cache, a processing unit (CPU), and a fetch process control unit. The memory stores a program in which a plurality of instructions are written. The instruction cache operates only when a branch instruction included in the program is executed, and data of a greater capacity than a width of a bus of the memory is read from the memory and stored in the instruction cache in advance. The processing unit accesses both the memory and the instruction cache and executes, in a pipelined manner, instructions read from the memory or the instruction cache. The fetch process control unit generates, in response to a branch instruction executed by the processing unit, a stop signal for stopping a fetch process of reading an instruction from the memory, and outputs the stop signal to the memory.

9 Claims, 13 Drawing Sheets

(56) References Cited

FOREIGN PATENT DOCUMENTS

| JP | 6-161750 A | 6/1994 |
|---|---|---|
| JP | 11-306016 A | 11/1999 |
| JP | 2000-357090 A | 12/2000 |
| JP | 2001-142698 A | 5/2001 |
| JP | 2006-048258 A | 2/2006 |
| JP | 2006-072926 A | 3/2006 |
| JP | 2008-52518 A | 3/2008 |

OTHER PUBLICATIONS

Extended European Search Report dated Aug. 26, 2015 issued in European Patent Application No. 12868386.9.
Japanese Office Action dated Jun. 2, 2015 issued Japanese Patent Application No. 2013-558608 (English translation).
International Search Report PCT/JP2012/053347 dated May 22, 2012.

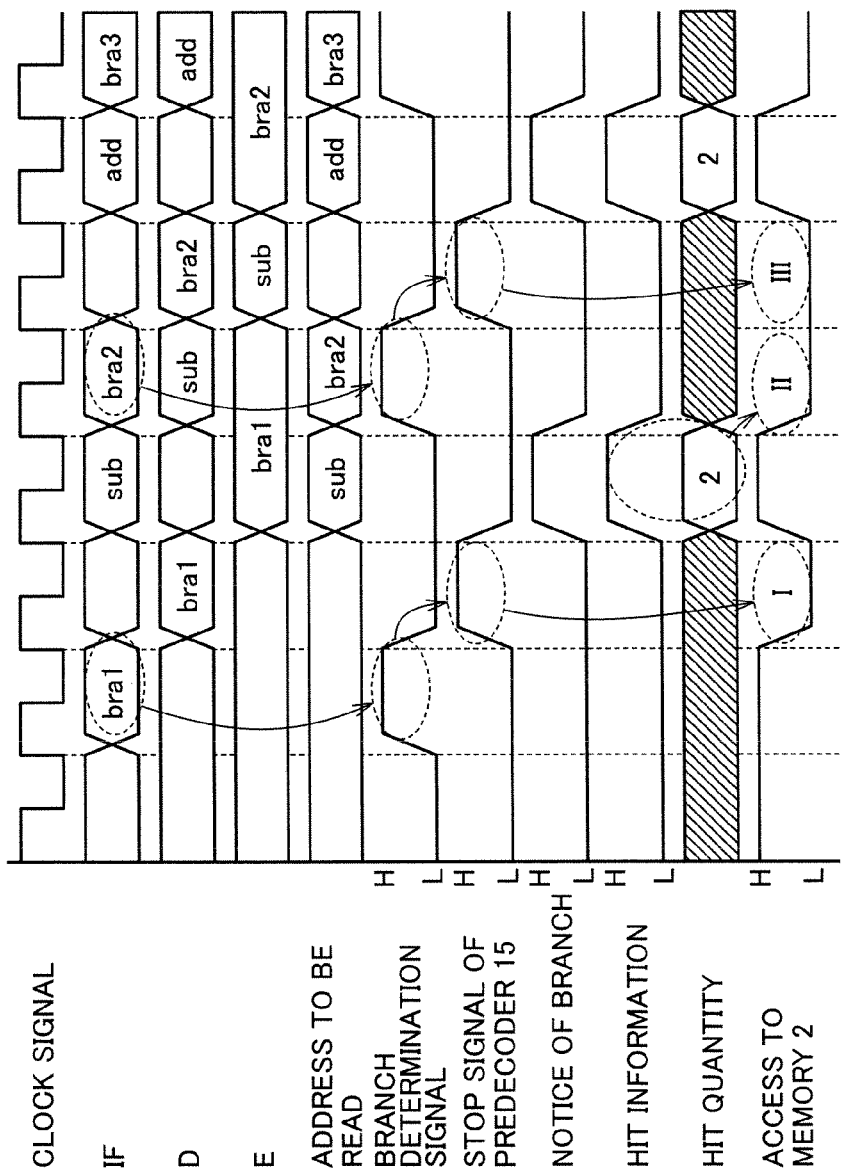

PROCESSOR WITH FETCH CONTROL FOR STOPPAGE

CROSS-REFERENCE TO RELATED APPLICATIONS

This application is the U.S. National Phase of PCT/JP2012/053347 filed Feb. 14, 2012 the subject matter of which is incorporated herein by reference in entirety.

TECHNICAL FIELD

The present invention relates to a data processor, and specifically to a data processor including a memory storing a program in which a plurality of instructions are written, and an instruction cache operating only when a branch instruction is executed, for example.

BACKGROUND ART

A data processor such as CPU (Central Processing Unit) is equipped with, in addition to a memory storing a program, an instruction cache temporarily storing instructions of the program in an attempt to improve the performance of processing. On the data processor, however, a penalty is imposed when a miss occurs, namely an instruction to be executed is not included in the instruction cache. The penalty has not been negligible for the data processor to exhibit improved performance of processing. Accordingly, a data processor has been proposed that is configured to access both the memory and the instruction cache and thereby avoid the penalty.

A data processor configured to include an instruction cache is also disclosed in PTD 1 (Japanese Patent Laying-Open No. 2008-052518) and PTD 2 (Japanese Patent Laying-Open No. 2001-142698). A CPU system disclosed in PTD 1 operates on the condition that the operating speed of a CPU is equal to or less than the operating speed during a burst read of an SDRAM. When the CPU is to process a branch instruction, a comparator determines whether the instruction cache memory stores an instruction of a branch target. When the instruction cache memory stores the instruction of the branch target, the instruction is read from the instruction cache memory.

A CPU disclosed in PTD 2 employs a memory access scheme according to which the CPU accesses a main memory simultaneously with accessing an instruction memory, so that an instruction code from the instruction memory and an instruction code from the main memory are seamlessly fetched.

In the data processor, when an instruction queue in which an instruction read from a memory is stored in advance has a free space, a fetch process that an instruction is read from the memory into the instruction queue is done regardless of an executive instruction. This fetch process is disclosed in PTD 3 (Japanese Patent Laying-Open No. 2006-048258), PTD 4 (Japanese Patent Laying-Open No. 06-161750), PTD 5 (Japanese Patent Laying-Open No. 2000-357090), and PTD 6 (Japanese Patent Laying-Open No. 05-027972).

A data processor disclosed in PTD 3 includes an instruction fetch control unit, an instruction buffer retaining an instruction fetched by the fetch control unit, and an execution unit executing instructions retained in the instruction buffer in a predetermined order and in a pipelined manner. The fetch control unit uses an instruction address of a branch instruction to acquire predictive information indicating a predicted direction of a conditional branch as well as the accuracy of prediction, is capable of fetching an instruction of a predicted branch for a conditional branch instruction and fetching an instruction of a non-predicted branch, and selectively stops fetching an instruction of a non-predicted branch in accordance with the predictive information.

A CPU disclosed in PTD 4 is equipped with an early-stage branch condition check circuit detecting the state of a tag at a prefetch timing for a branch instruction and making a branch determination in an early stage in consideration of the contents of a zero flag in a buffer or in a condition code.

A CPU disclosed in PTD 5 includes therein a branch prediction mechanism for the purpose of shortening the time taken to access a main memory when a cache miss occurs for a conditional branch instruction.

A CPU disclosed in PTD 6 has an instruction detector between an instruction queue and a memory and, when a branch instruction is included in instructions read into the instruction queue, the CPU temporarily stops reading instructions from the memory until a branch target address of the branch instruction is confirmed.

CITATION LIST

Patent Document

PTD 1: Japanese Patent Laying-Open No. 2008-052518
PTD 2: Japanese Patent Laying-Open No. 2001-142698
PTD 3: Japanese Patent Laying-Open No. 2006-048258
PTD 4: Japanese Patent Laying-Open No. 06-161750
PTD 5: Japanese Patent Laying-Open No. 2000-357090
PTD 6: Japanese Patent Laying-Open No. 05-027972

SUMMARY OF INVENTION

Technical Problem

The conventional data processor, however, accesses both the memory and the instruction cache in order to avoid the penalty which is imposed when a miss occurs, namely when an instruction to be executed is not included in the instruction cache. Thus, the conventional data processor accesses the memory even when a hit occurs, namely when the instruction cache includes the instruction, which results in a problem that electric power for accessing both the memory and the instruction cache is consumed all the time.

Moreover, in the conventional data processor, a fetch process of reading an instruction from a memory regardless of an executive instruction occurs when there is a free space in the instruction queue into which an instruction from a memory is read in advance. Thus, the conventional data processor consumes electric power for reading unnecessary instructions from the memory and making useless memory accesses. Particularly in the case where a fetch process is performed immediately before a branch instruction, the fetch process may read an instruction which will be found unnecessary to be executed as a result of the branch, resulting in a problem that electric power is consumed for the useless memory access.

Other problems and new features will become apparent from the description herein as well as the attached drawings.

Solution to Problem

In accordance with one embodiment, a data processor includes a memory, an instruction cache, a processing unit, and a fetch process control unit. The memory stores a program in which a plurality of instructions are written. The instruction cache operates only when a branch instruction included in the program is executed, and data of a greater capacity than a width of a bus of the memory is read from the memory and stored in the instruction cache in advance. The processing unit accesses both the memory and the instruction cache and executes, in a pipelined manner, instructions read from the memory or the instruction cache. The fetch process control unit generates, in response to a branch instruction executed by the processing unit, a stop signal for stopping a fetch process of reading an instruction from the memory, and outputs the stop signal to the memory.

Advantageous Effects of Invention

In accordance with the one embodiment above, the data processor can reduce electric power which is consumed for accessing the memory. In particular, the data processor can reduce electric power which is consumed when both the memory and the instruction cache are accessed as well as electric power which is consumed when a fetch process is performed for reading from the memory an instruction which will be found unnecessary to be executed as a result of a branch.

BRIEF DESCRIPTION OF DRAWINGS

FIG. 20 is a timing chart for illustrating an operation of the data processor according to the seventh embodiment.

DESCRIPTION OF EMBODIMENTS

In the following, embodiments of the present invention will be described with reference to the drawings.

First Embodiment

Figure 1:
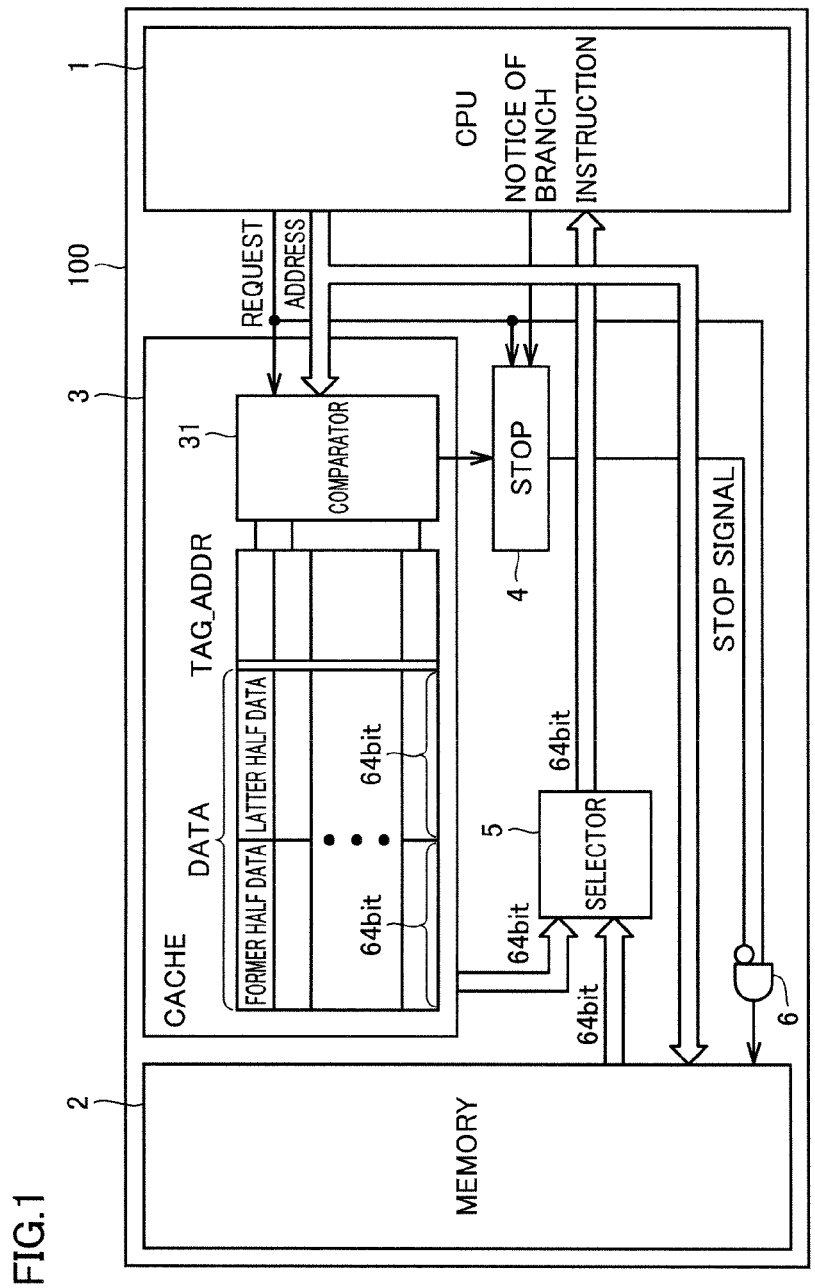
FIG. 1 is a block diagram showing a configuration of a data processor according to a first embodiment.

FIG. 1 is a block diagram showing a configuration of a data processor according to a first embodiment. Data processor 100 shown in FIG. 1 includes a CPU 1, a memory 2, an instruction cache 3, and a stop unit 4. CPU 1 accesses both memory 2 and instruction cache 3 to read an instruction from memory 2 or instruction cache 3 (fetch process). Data processor 100 accesses both memory 2 and instruction cache 3 to thereby reduce penalties resultant from cache misses.

CPU 1 can execute instructions in a pipelined manner that are read from memory 2 and instruction cache 3. When CPU 1 is to access memory 2 and instruction cache 3, CPU 1 outputs, to memory 2 and instruction cache 3, a request to read an instruction as well as an address of the instruction to be read. When the read instruction is a branch instruction, CPU 1 further outputs a notice of branch.

Memory 2 stores a program in which a plurality of instructions are written. Based on the request and the address given from CPU 1, memory 2 outputs to CPU 1 the instruction stored at this address. The width of a bus through which the instruction is output from memory 2 to CPU 1 is 64 bits.

Instruction cache 3 operates only when a branch instruction included in the program is executed. Data of a greater capacity than the width of the bus of memory 2 is read from memory 2 and stored in instruction cache 3 in advance. Specifically, instruction cache 3 can store data of 128 bits which is twice as large as the width of the bus of memory 2. Instruction cache 3 stores the data in the form of being divided into former half data of 64 bits and latter half data of 64 bits. The instruction stored in the former half data and the instruction stored in the latter half data are consecutive instructions.

Instruction cache 3 also stores the address of the stored instruction in the form of TAG_ADDR information. Instruction cache 3 includes a comparator 31 for comparing an address of an instruction requested by CPU 1 with an address stored in the TAG_ADDR information.

When CPU 1 executes a branch instruction, comparator 31 compares an address in memory 2 to be accessed (the address of an instruction requested by CPU 1) with an address of an instruction stored in advance (an address stored in the TAG_ADDR information). Utilizing the consecutiveness of instructions stored in instruction cache 3, comparator 31 determines that an instruction of a branch target following the instruction requested by CPU 1 is stored in instruction cache 3. Specifically, when comparator 31 identifies the address in memory 2 to be accessed as being stored in the former half data, comparator 31 determines that the instruction of the branch target is stored in the latter half data.

Figure 2:
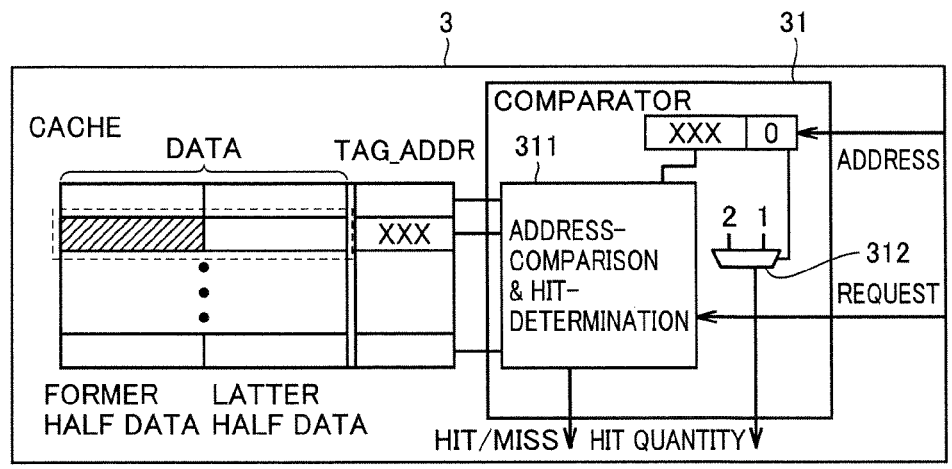
FIG. 2 is a block diagram showing a more detailed configuration of an instruction cache of the data processor according to the first embodiment.

FIG. 2 is a block diagram showing a more detailed configuration of instruction cache 3 of data processor 100 according to the first embodiment. Comparator 31 shown in FIG. 2 includes an address-comparison and hit-determination unit 311 and a hit quantity counter 312. Address-comparison and hit-determination unit 311 is activated by a request from CPU 1 to compare an address in memory 2 to be accessed with an address stored in the TAG_ADDR information. Address-comparison and hit-determination unit 311 outputs hit information when these addresses match each other (hit), and outputs miss information when these addresses do not match each other (miss).

When an address in memory 2 to be accessed matches an address of an instruction stored in the former half data, hit quantity counter 312 outputs a hit quantity of "2". When an address in memory 2 to be accessed matches an address of an instruction stored in the latter half data, hit quantity counter 312 outputs a hit quantity of "1". The hit quantity is a value representing the number of times CPU 1 can access instruction cache 3 for reading the data therefrom. Specifically, in the case of the hit quantity "2", CPU 1 can access instruction cache 3 twice to read the former half data and the latter half data. In the case of the hit quantity "1". CPU 1 can access instruction cache 3 once to read only the latter half data.

When comparator 31 determines that instruction cache 3 stores an instruction of a branch target, stop unit 4 generates and outputs to memory 2 a stop signal for stopping a fetch process during a period in which the instruction stored in instruction cache 3 is read.

Figure 3:
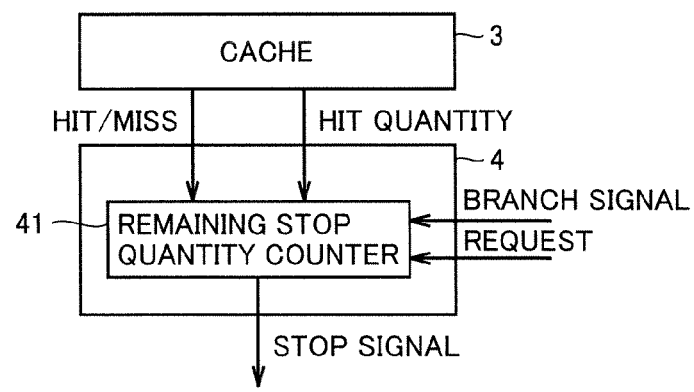
FIG. 3 is a block diagram showing a more detailed configuration of a stop unit of the data processor according to the first embodiment.

FIG. 3 is a block diagram showing a more detailed configuration of stop unit 4 of data processor 100 according to the first embodiment. Stop unit 4 includes a remaining stop quantity counter 41. Remaining stop quantity counter 41 is activated by a request from CPU 1 to set a count of the remaining stop quantity counter based on hit or miss information and the hit quantity that are given from instruction cache 3, and generates and outputs to memory 2 a stop signal when the count of the remaining stop quantity counter reaches "0".

Specifically, remaining stop quantity counter 41 calculates an initial value of the count of the remaining stop quantity counter, from the hit or miss information and the hit quantity from instruction cache 3. For example, when remaining stop quantity counter 41 receives from instruction cache 3 the hit information and the hit quantity "2", counter 41 sets the count of the stop quantity counter to "1". When remaining stop quantity counter 41 receives from instruction cache 3 the hit information and the hit quantity "1", counter 41 sets the count of the stop quantity counter to "0". Remaining stop quantity counter 41 having set the initial value counts down the count of the stop quantity counter by "1" each time it receives a request from CPU 1. When remaining stop quantity counter 41 receives a branch signal from CPU 1, counter 41 sets the count of the stop quantity counter to "0" regardless of the value of the count of the stop quantity counter, and does not generate the stop signal.

Data processor 100 uses a selector 5 to select one of instructions read respectively by accessing both memory 2 and instruction cache 3, and reads the selected instruction into CPU 1. For example, when respective instructions read from memory 2 and instruction cache 3 are identical to each other, selector 5 selects the instruction read from instruction cache 3. When respective instructions read from memory 2 and instruction cache 3 are different from each other, selector 5 selects the instruction read from memory 2.

Figure 4:
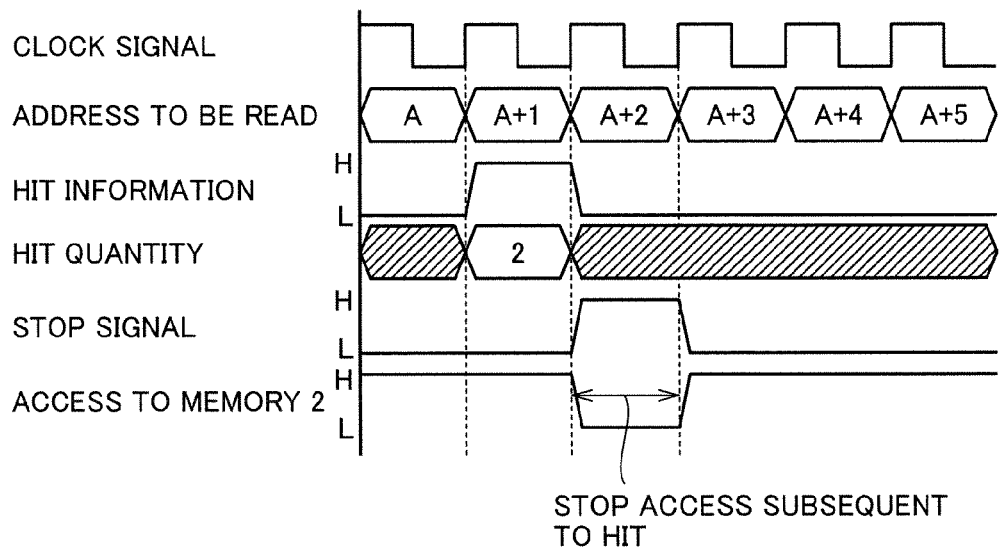
FIG. 4 is a timing chart for illustrating an operation of the data processor according to the first embodiment.

An operation of data processor 100 according to the first embodiment will now be described. FIG. 4 is a timing chart for illustrating the operation of data processor 100 according to the first embodiment. The timing chart shown in FIG. 4 illustrates respective waveforms of a clock signal of CPU 1, addresses to be read, the hit information, the hit quantity, the stop signal, and an access-to-memory 2 signal.

Regarding the addresses of instructions to be read, one address is output from CPU 1 to memory 2 and instruction cache 3 per cycle of the clock signal of CPU 1. In the example shown in FIG. 4, the addresses of the instructions to be read include Address A, Address A+1, Address A+2, Address A+3, Address A+4, and Address A+5 that are output in this order from CPU 1 to memory 2 and instruction cache 3.

In instruction cache 3, the instruction of Address A+1 is stored in the former half data and the instruction of Address A+2 is stored in the latter half data. When comparator 31 receives Address A+1 as an address of an instruction to be read, comparator 31 compares the received Address A+1 with an address stored in the TAG_ADDR information. From the fact that the received Address A+1 matches the address of the instruction stored in the former half data, comparator 31 can determine that the address of the instruction stored in the latter half data is Address A+2 since the instructions are consecutive. Comparator 31 accordingly outputs the hit information and the hit quantity "2" to stop unit 4. Namely as shown in FIG. 4, at the timing of Address A+1 which is an address of an instruction to be read, the hit information is "H" level and the hit quantity is "2".

Since the instruction of Address A+2 is stored in the latter half data, stop unit 4 can stop access to memory 2 during a period in which the instruction of Address A+2 is read from instruction cache 3. Thus, receiving the hit information and the hit quantity "2" from comparator 31 (instruction cache 3), remaining stop quantity counter 41 sets the count of the stop quantity counter to "1" and outputs the stop signal to memory 2 during the period of one access to memory 2. Namely, as shown in FIG. 4, at the timing of Address A+2 which is an address of an instruction to be read, the stop signal is "H" level.

Memory 2 receives the access-to-memory 2 signal, namely receives a signal representing the result of an AND operation performed by a processing unit 6 shown in FIG. 1 for an inverse signal of the stop signal and the signal of the request from CPU 1. In other words, when the signal of the request from CPU 1 is "H" level and the stop signal is "L" level, the access-to-memory 2 signal is "H" level. In contrast, when the stop signal is "H" level, the access-to-memory 2 signal is "L" level. As shown in FIG. 4, at the timing of Address A+2 of the instruction to be read, the stop signal is "H" level and accordingly the access-to-memory 2 signal is "L" level.

In response to the access-to-memory 2 signal changed to "L" level, access from CPU 1 to memory 2 is stopped. In data processor 100, during stoppage of access from CPU 1 to memory 2, the power consumption can be reduced.

As set forth above, the instructions are consecutive and therefore instruction cache 3 stores the instruction of Address A+1 in the former half data and the instruction of Address A+2 in the latter half data. In the case, however, where execution of the instruction of Address A+1 by CPU 1 results in the fact that the address of the instruction to be read next is Address B, access from CPU 1 to memory 2 cannot be stopped. Accordingly. CPU 1 outputs a notice of branch to stop unit 4 so that change of the stop signal to "H" level is cancelled.

Figure 5:
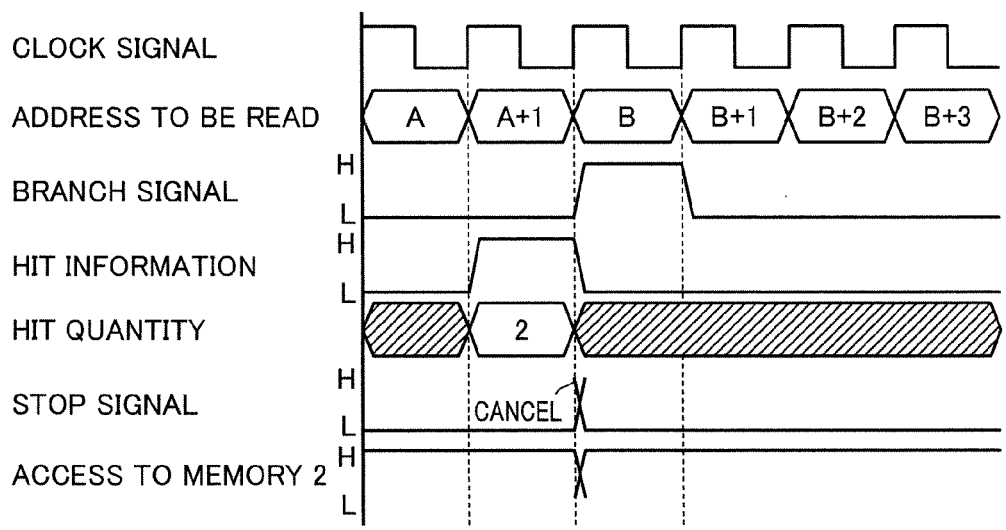
FIG. 5 is a timing chart for illustrating an operation when a notice of branch is issued in the data processor according to the first embodiment.

FIG. 5 is a timing chart for illustrating an operation when the notice of branch is issued in data processor 100 according to the first embodiment. The timing chart shown in FIG. 5 illustrates respective waveforms of the clock signal of CPU 1, addresses to be read, the hit information, the hit quantity, the stop signal, and the access-to-memory 2 signal.

Regarding the addresses of instructions to be read, one address is output from CPU 1 to memory 2 and instruction cache 3 per cycle of the clock signal of CPU 1. In the example shown in FIG. 5, the addresses of the instructions to be read include Address A, Address A+1, Address B, Address B+1, Address B+2, and Address B+3 that are output in this order from CPU 1 to memory 2 and instruction cache 3. Namely, as a result of CPU 1's execution of the instruction of Address A+1, the order of the addresses to be read subsequently is Address B, Address B+1, Address B+2, and Address B+3, rather than the order of Address A+2, Address A+3, Address A+4, and Address A+5.

Instruction cache 3, however, follows the consecutiveness of instructions to store the instruction of Address A+1 in the former half data and the instruction of Address A+2 in the latter half data. When comparator 31 receives Address A+1 as an address of an instruction to be read, comparator 31 compares the received address A+1 with an address stored in the TAG_ADDR information. From the fact that the received address A+1 matches the address of the instruction stored in the former half data, comparator 31 determines that the address of the instruction stored in the latter half data is address A+2 since the instructions are consecutive. Comparator 31 accordingly outputs the hit information and the hit quantity "2" to stop unit 4. Namely as shown in FIG. 5, at the timing of Address A+1 which is an address of an instruction to be read, the hit information is "H" level and the hit quantity is "2".

Accordingly stop unit 4 is to output the stop signal to memory 2. However, when the instruction of Address A+1 causes a branch to the instruction of Address B, the address of the instruction requested next by CPU 1 is Address B rather than Address A+2. Thus, if the access from CPU 1 to memory 2 is stopped, CPU 1 suffers from a penalty of a cache miss. CPU 1 avoids the cache miss in the following way. Specifically, in the case where execution of an instruction is followed by a branch to an instruction to be read next, CPU 1 outputs a notice of branch to stop unit 4 to thereby cause output of the stop signal to memory 2 to be cancelled. Namely, as shown in FIG. 5, change of the stop signal to "H" level at the timing of Address A+2 of the instruction to be read is cancelled.

Memory 2 receives the access-to-memory 2 signal, namely receives a signal representing the result of an AND operation performed by processing unit 6 shown in FIG. 1 for an inverse signal of the stop signal and the signal of the request from CPU 1. Since the signal of the request from CPU 1 is "H" level and the stop signal is "L" level, the access-to-memory 2 signal is kept at "H" level.

The access-to-memory 2 signal is thus kept at "H" level and accordingly access from CPU 1 to memory 2 is not stopped. Data processor 100 can thus cause CPU 1 to access both memory 2 and instruction cache 3 to thereby reduce penalties of cache misses.

As seen from the foregoing, in data processor 100 of the first embodiment, when comparator 31 determines that instruction cache 3 stores an instruction of a branch target, stop unit 4 generates and outputs to memory 2 the stop signal for stopping a fetch process during the period in which the instruction stored in instruction cache 3 is read. In data processor 100, power consumption can thus be reduced during the period in which access from CPU 1 to memory 2 is stopped.

While it has been described herein that data processor 100 has memory 2 formed on a semiconductor substrate on which CPU 1 is also formed (one-chip semiconductor device), memory 2 may be formed on a semiconductor substrate located outside CPU 1. It should be noted that in the case where memory 2 is formed on a semiconductor substrate located outside CPU 1, data processor 100 has to be equipped with a CPU interface for connecting CPU 1 and memory 2 to each other.

Data processor 100 is not limited to a fixed instruction length but may have a variable instruction length.

Second Embodiment

Data processor 100 of the first embodiment has been described as being configured to include instruction cache 3 capable of storing data which is twice as large as the width of the bus of memory 2. The capacity of data which can be stored in instruction cache 3, however, is not limited to twice as large as the width of the bus of memory 2. The following is a description of a data processor of a second embodiment that is configured to include an instruction cache capable of storing more data than the instruction cache of the first embodiment.

Figure 6:
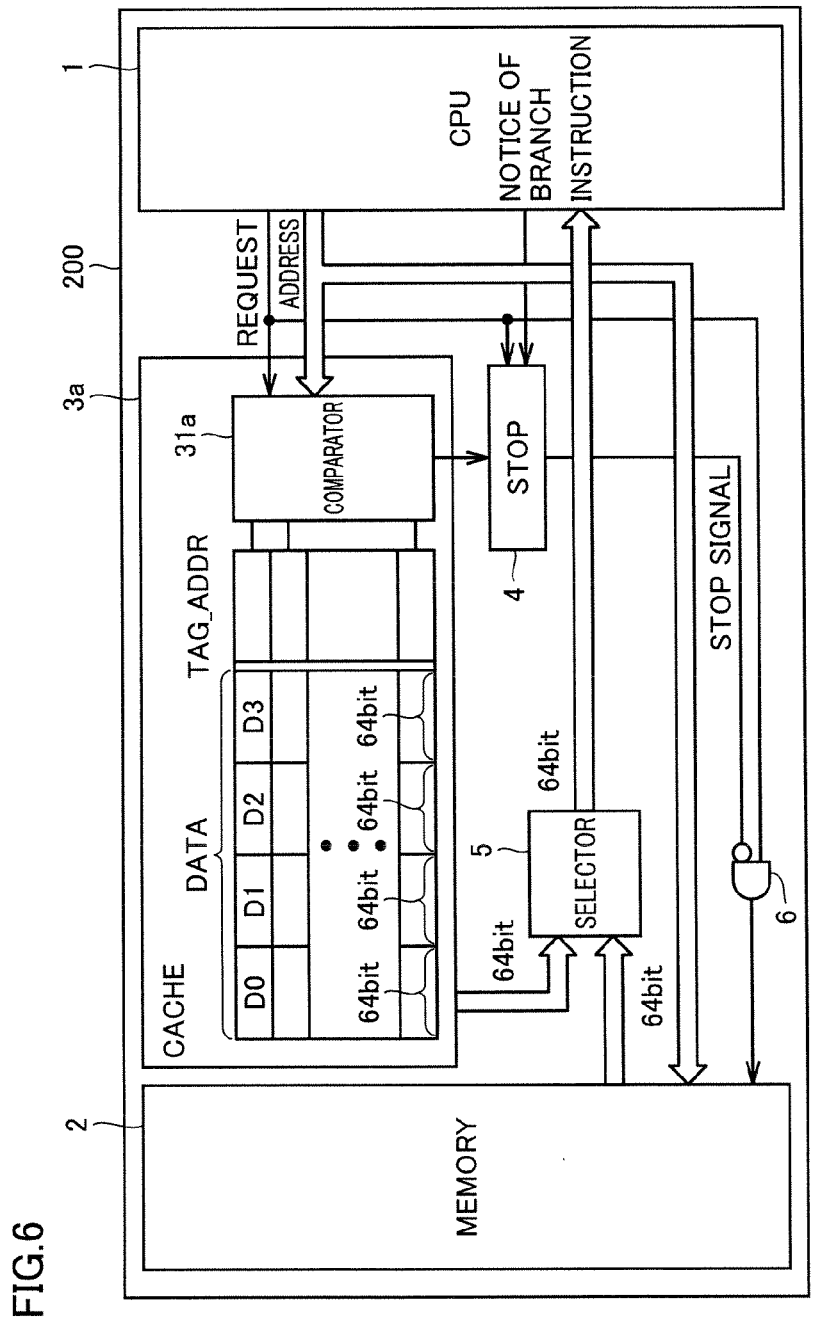
FIG. 6 is a block diagram showing a configuration of a data processor according to a second embodiment.

FIG. 6 is a block diagram showing a configuration of the data processor according to the second embodiment. Data processor 200 shown in FIG. 6 includes a CPU 1, a memory 2, an instruction cache 3*a*, and a stop unit 4. CPU 1 accesses both memory 2 and instruction cache 3*a* to read an instruction from memory 2 or instruction cache 3 (fetch process). The same component of data processor 200 as that of data processor 100 of the first embodiment will be denoted by the same reference character, and the detailed description thereof will not be repeated.

Instruction cache 3*a* operates only when a branch instruction included in a program is executed. Data of a greater capacity than the width of the bus of memory 2 is read from memory 2 and stored in instruction cache 3*a* in advance. Specifically, instruction cache 3*a* is capable of storing data of 256 bits which is four times as large as the width of the bus of memory 2. Instruction cache 3*a* stores the data in the form of being divided into D0 data, D1 data, D2 data, and D3 data each having 64 bits. The instructions stored respectively in the D0 data to the D3 data are consecutive instructions.

Instruction cache 3*a* also stores the address of the stored instruction in the form of TAG_ADDR information. Instruction cache 3*a* includes a comparator 31*a* for comparing an address of an instruction requested by CPU 1 with an address stored in the TAG_ADDR information.

When CPU 1 executes a branch instruction, comparator 31*a* compares an address in memory 2 to be accessed (the address of the instruction requested by CPU 1) with an address of an instruction stored in advance (an address stored in the TAG_ADDR information). Utilizing the consecutiveness of instructions stored in instruction cache 3*a*, comparator 31*a* determines that an instruction of a branch target following the instruction requested by CPU 1 is stored in instruction cache 3*a*. Specifically, when comparator 31*a* identifies the address in memory 2 to be accessed as matching the address of an instruction stored in the D0 data, comparator 31a determines that the instruction of the branch target is stored in the D1 data to the D3 data.

Figure 7:
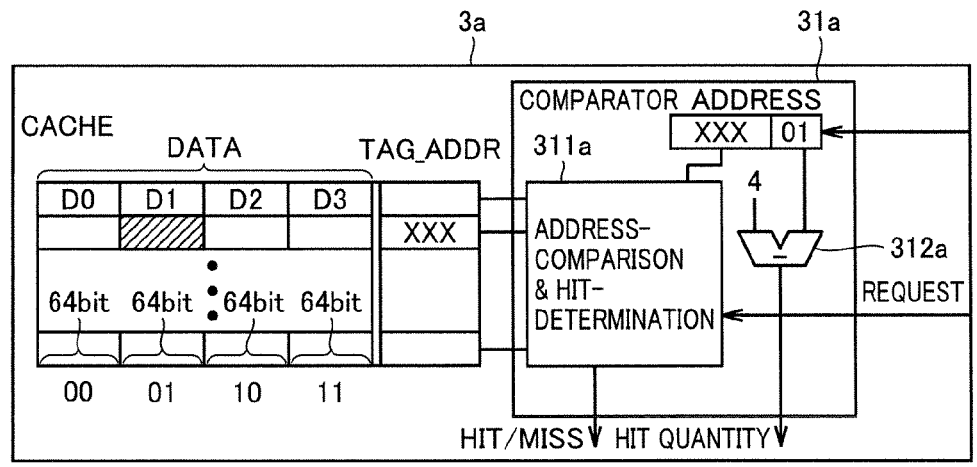
FIG. 7 is a block diagram showing a more detailed configuration of an instruction cache of the data processor according to the second embodiment.

FIG. 7 is a block diagram showing a more detailed configuration of instruction cache 3a of data processor 200 according to the second embodiment. Comparator 31a shown in FIG. 7 includes an address-comparison and hit-determination unit 311a and a hit quantity counter 312a. Address-comparison and hit-determination unit 311a is activated by a request from CPU 1 to compare an address in memory 2 to be accessed with an address stored in the TAG_ADDR information. Address-comparison and hit-determination unit 311a outputs hit information when these addresses match each other (hit), and outputs miss information when these addresses do not match each other.

When an address in memory 2 to be accessed matches an address of an instruction stored in the D0 data, hit quantity counter 312a outputs a hit quantity of "4". When an address in memory 2 to be accessed matches an address of an instruction stored in the D1 data, hit quantity counter 312a outputs a hit quantity of "3". A hit quantity of "4" is output. When an address in memory 2 to be accessed matches an address of an instruction stored in the D2 data, hit quantity counter 312a outputs a hit quantity of "2". A hit quantity of "4" is output. When an address in memory 2 to be accessed matches an address of an instruction stored in the D3 data, hit quantity counter 312a outputs a hit quantity of "1". The hit quantity is a value representing the number of times CPU 1 can access instruction cache 3a for reading the data therefrom. Specifically, in the case of the hit quantity "4", CPU 1 can access instruction cache 3a four times to read instructions of the D1 data to the D3 data.

Figure 8:
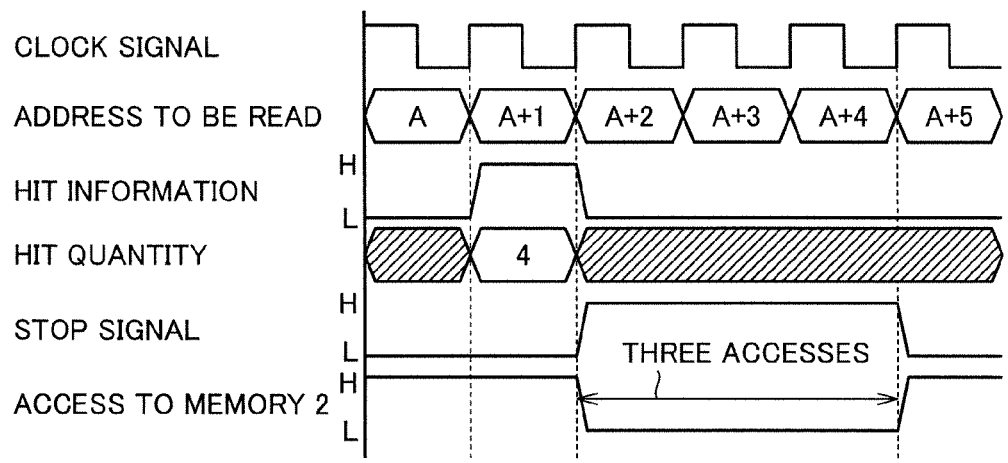
FIG. 8 is a timing chart for illustrating an operation of the data processor according to the second embodiment.

An operation of data processor 200 according to the second embodiment will now be described. FIG. 8 is a timing chart for illustrating the operation of data processor 200 according to the second embodiment. The timing chart shown in FIG. 8 illustrates respective waveforms of the clock signal of CPU 1, addresses to be read, the hit information, the hit quantity, the stop signal, and the access-to-memory 2 signal.

Regarding the addresses of instructions to be read, one address is output from CPU 1 to memory 2 and instruction cache 3a per cycle of the clock signal of CPU 1. In the example shown in FIG. 8, the addresses of the instructions to be read include Address A, Address A+1, Address A+2, Address A+3, Address A+4, and Address A+5 that are output in this order from CPU 1 to memory 2 and instruction cache 3a.

In instruction cache 3a, the instruction of Address A+1 is stored in the D0 data, the instruction of Address A+2 is stored in the D1 data, the instruction of Address A+3 is stored in the D2 data, and the instruction of Address A+4 is stored in the D3 data. When comparator 31a receives Address A+1 as an address of an instruction to be read, comparator 31a compares the received Address A+1 with an address stored in the TAG_ADDR information. From the fact that the received Address A+1 matches the address of the instruction stored in the D0 data, comparator 31a can determine that the addresses of the instructions stored in the D1 data to the D3 data are Address A+2 to Address A+4 since the instructions are consecutive. Comparator 31a accordingly outputs the hit information and the hit quantity "4" to stop unit 4. Namely as shown in FIG. 8, at the timing of Address A+1 which is an address of an instruction to be read, the hit information is "H" level and the hit quantity is "4".

Since the instructions of Address A+2 to Address A+4 are stored in the D1 data to the D3 data, stop unit 4 can stop access to memory 2 during a period in which the instructions of Address A+2 to Address A+4 are read from instruction cache 3. Thus, receiving the hit information and the hit quantity "4" from comparator 31a (instruction cache 3a), remaining stop quantity counter 41 sets the count of the stop quantity counter to "3" and outputs the stop signal to memory 2 during the period of three accesses to memory 2. Namely, as shown in FIG. 8, at the timing of Address A+2 to Address A+4 which are addresses of instructions to be read, the stop signal is "H" level.

Memory 2 receives the access-to-memory 2 signal, namely receives a signal representing the result of an AND operation performed by processing unit 6 shown in FIG. 1 for an inverse signal of the stop signal and the signal of the request from CPU 1. In other words, when the signal of the request from CPU 1 is "H" level and the stop signal is "L" level, the access-to-memory 2 signal is "H" level. In contrast, when the stop signal is "H" level, the access-to-memory 2 signal is "L" level. As shown in FIG. 8, at the timing of Address A+2 to Address A+4 of the instructions to be read, the stop signal is "H" level and accordingly the access-to-memory 2 signal is "L" level.

In response to the access-to-memory 2 signal changed to "L" level, access from CPU 1 to memory 2 is stopped. In data processor 200, during stoppage of access from CPU 1 to memory 2, the power consumption can be reduced.

As seen from the foregoing, in data processor 200 of the second embodiment, instruction cache 3a has a capacity of four times as large as the width of the bus of memory 2, and stop unit 4 stops access to memory 2 three times at a maximum. Therefore, the period during which access to memory 2 is stopped is longer than that of the first embodiment and accordingly power consumption can further be reduced.

The capacity of instruction cache 3a is not limited to four times as large as the bus width. Instruction cache 3a may be configured to have a capacity of N times as large as the width of the bus of the memory and stop unit 4 may be configured to stop access to memory 2 N−1 times at a maximum.

Third Embodiment

Data processors 100, 200 of the first and second embodiments have been described as being configured to use stop unit 4 (fetch process control unit) provided outside CPU 1 to thereby stop access to memory 2. In the case, however, where there is a free space in an instruction queue included in CPU 1, CPU 1 performs a prefetch process of accessing memory 2 and reading an instruction from memory 2. The following is a description of a data processor of a third embodiment that is configured to include, in the CPU, a fetch process control unit to stop access to memory 2.

Figure 9:
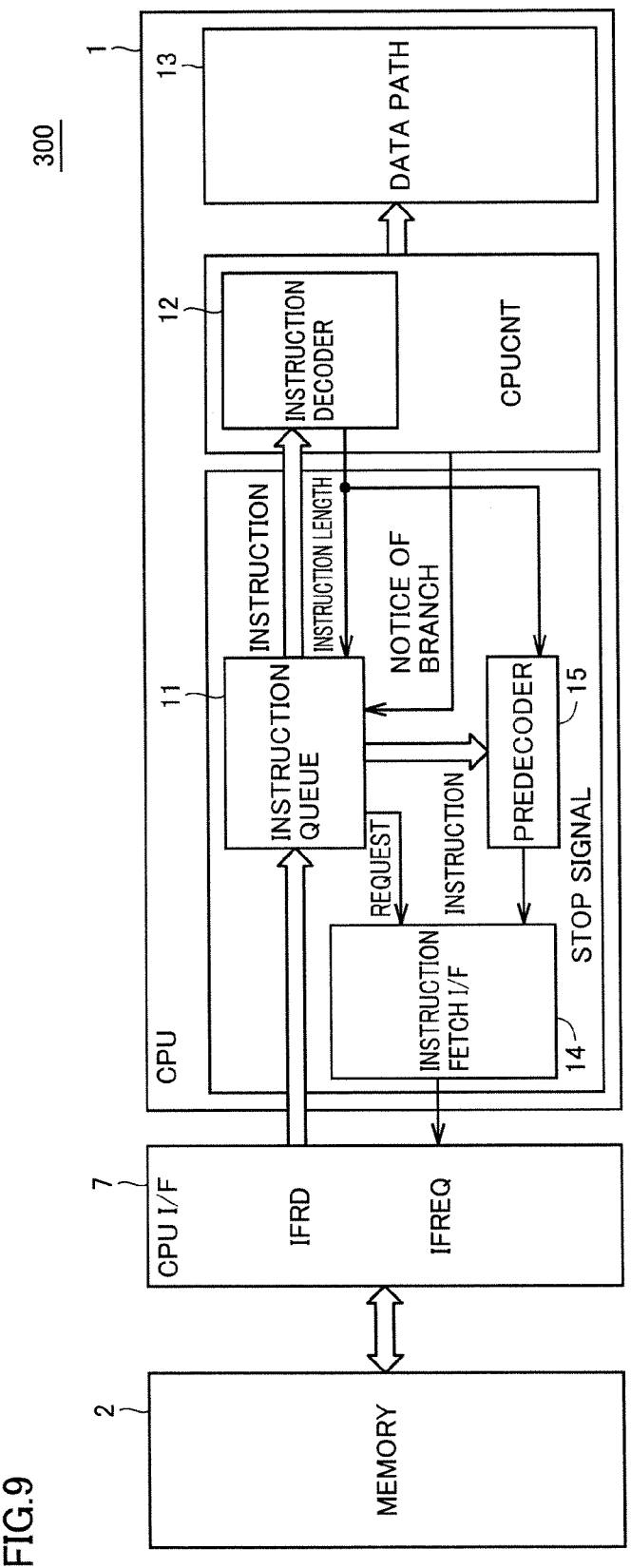
FIG. 9 is a block diagram showing a configuration of a data processor according to a third embodiment.

FIG. 9 is a block diagram showing the configuration of the data processor according to the third embodiment. Data processor 300 shown in FIG. 9 includes a CPU 1 and a CPU interface 7, and CPU 1 accesses memory 2 through CPU interface 7 to read an instruction from memory 2 (prefetch process). The same component of data processor 300 as that of data processor 100 of the first embodiment will be denoted by the same reference character, and the detailed description thereof will not be repeated.

Regarding data processor 300, even if a waiting time corresponding to a-few-clock-cycles waiting is necessary for accessing memory 2, the performance of data processor 300 in a normal mode is not deteriorated as long as it has an adequate ability of providing instructions. Deterioration of the performance of data processor 300 may therefore be accepted only when a branch instruction is executed.

CPU 1 includes an instruction queue 11, an instruction decoder 12, a data path 13, an instruction fetch interface unit 14, and a predecoder 15. Instruction queue 11 is a storage unit in which instructions read from memory 2 are stored in advance (prefetch process). Instruction decoder 12 is a part of a CPUCNT unit for successively reading the instructions stored in the instruction queue and decoding the instructions. Data path 13 is an instruction execution unit executing the instructions decoded by instruction decoder 12. Instruction fetch interface unit 14 outputs to memory 2 a request to read (IFREQ) given from instruction queue 11.

Predecoder 15 determines whether or not an instruction to be decoded next by instruction decoder 12 is a branch instruction. When the instruction is the branch instruction, predecoder 15 generates and outputs to instruction fetch interface unit 14 a stop signal for stopping the prefetch process. Namely predecoder 15 is capable of functioning as a fetch process control unit to stop access to memory 2.

Figure 10:
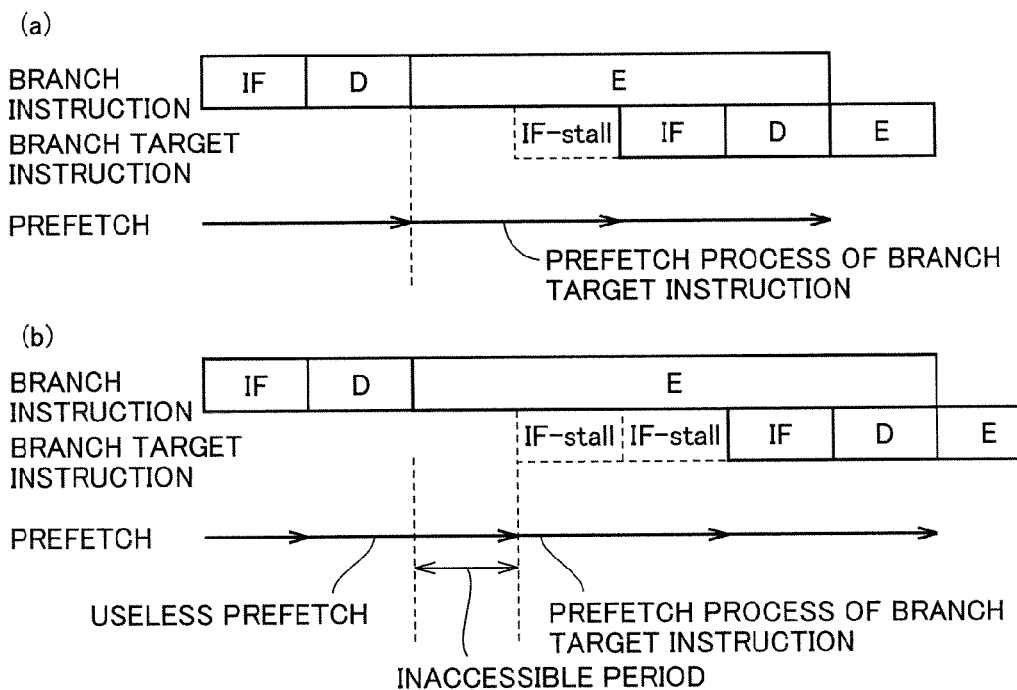
FIG. 10 is a timing chart for illustrating a timing of a prefetch process in a data processor configured to include no predecoder.

Before a description will be made of an operation of data processor 300 according to the third embodiment, a description will first be given of an operation of a data processor configured to include no predecoder 15. FIG. 10 is a timing chart for illustrating a timing of a prefetch process in the data processor configured to include no predecoder 15. FIG. 10 (a) shows an example where a prefetch process is performed at a timing when a branch instruction is executed, and FIG. 10 (b) shows an example where a prefetch process is performed at a timing before a branch instruction is executed.

Here, the timing chart shown in FIG. 10 illustrates respective timings of a branch instruction, a branch target instruction, and a prefetch process. The branch instruction and the branch target instruction each include an instruction fetch stage IF, an instruction decode stage D, and an execution stage E. In the instruction fetch stage IF (Instruction Fetch), an instruction stored in the instruction queue is read into the instruction decoder. In the instruction decode stage D (Decode), the instruction provided from the instruction fetch stage IF is decoded. In the execution stage E (Execute), the instruction decoded in the instruction decode stage D is executed. For example, an arithmetic logical operation is performed or whether or not an instruction is a branch instruction is determined.

As shown in FIG. 10, the CPU performs, for the branch instruction and the branch target instruction, the instruction fetch stage IF in one clock cycle and the instruction decode stage D in one clock cycle, and performs, after one-clock-cycle waiting, the prefetch process of accessing the memory in two clock cycles. Therefore, as shown in the timing chart in FIG. 10 (a), if execution of the prefetch process is started at the timing when the instruction fetch stage IF is started, the CPU can execute the prefetch process of the branch target instruction from the first clock cycle of the execution stage E.

If the CPU can execute the prefetch process of the branch target instruction from the first clock cycle of the execution stage E, the CPU can execute the instruction fetch stage IF of the branch target instruction from the third clock cycle of the execution stage E of the branch instruction. Namely, the CPU can reduce, to one clock cycle, a period (IF-stall) in which execution of the instruction fetch stage IF of the branch target instruction is waited for.

In contrast, as shown in the timing chart in FIG. 10 (b), if the CPU starts executing the prefetch process at the timing when the instruction decode stage D is started, the CPU cannot execute the prefetch process of the branch target instruction from the first clock cycle of the execution stage E. In the first cycle of the execution stage E, the CPU thus accesses the memory for executing a prefetch process of another instruction. Therefore, the CPU cannot access the memory for executing the prefetch process of the branch target instruction. Accordingly, the CPU starts the prefetch process of the branch target instruction from the second clock cycle of the execution stage E of the branch instruction. Thus, two clock cycles are necessary for the period (IF-stall) in which execution of the instruction fetch stage IF of the branch target instruction is waited for.

In the prefetch process which is started before the instruction decode stage D of the branch instruction, an instruction different from the branch target instruction is read from the memory, namely the instruction which is unnecessary to be executed is read from the memory. This is therefore a useless prefetch process.

In view of the above, data processor 300 of the third embodiment is equipped with predecoder 15 which provides a mechanism of stopping the prefetch process in the clock cycle before the branch instruction. Accordingly, useless accesses to memory 2 are reduced and the power consumption is reduced.

Figure 11:
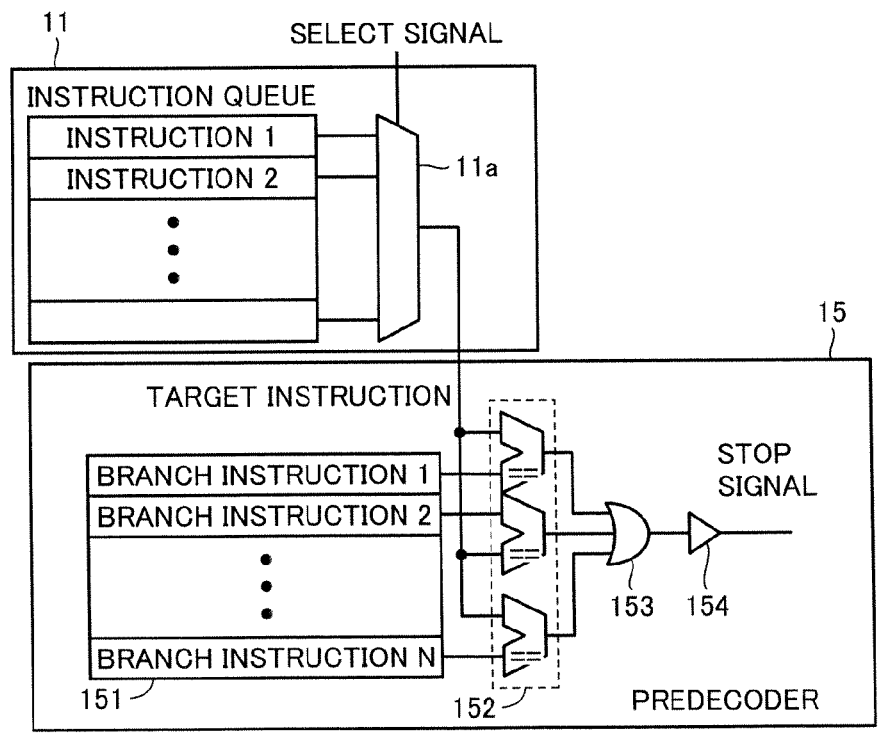
FIG. 11 is a block diagram showing a configuration of an instruction queue and a predecoder of the data processor according to the third embodiment.

FIG. 11 is a block diagram showing a configuration of instruction queue 11 and predecoder 15 of data processor 300 according to the third embodiment. Predecoder 15 includes a storage unit 151, a comparison unit 152, and an operation unit 153. Storage unit 151 stores in advance branch instructions (instructions for which stoppage is to be effected) for which the prefetch process has to be stopped. Storage unit 151 stores for example N branch instructions from Branch Instruction 1 to Branch Instruction N.

Comparison unit 152 compares a target instruction read from instruction queue 11 with a branch instruction (instruction for which stoppage is to be effected) which is stored in advance in storage unit 151. Operation unit 153 performs an operation on the result of a comparison between the target instruction and each branch instruction stored in storage unit 151 to thereby generate a stop signal. The stop signal generated by operation unit 153 is amplified to a predetermined voltage level by an amplifier 154 and output to instruction fetch interface unit 14.

Instruction queue 11 has a selector 11a. From stored instructions, selector 11a selects, based on a select signal, an instruction to be executed next, and outputs the selected instruction to comparison unit 152.

Figure 12:
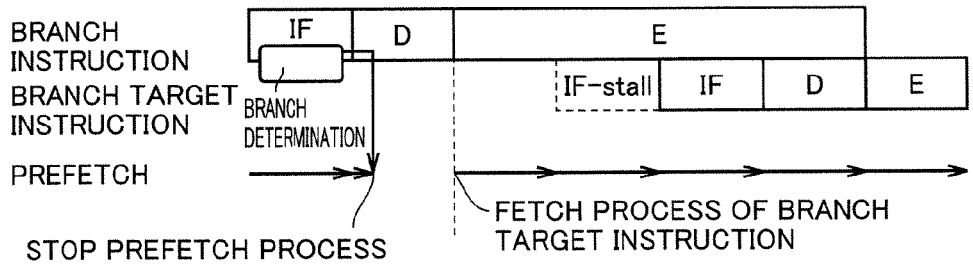
FIG. 12 is a timing chart for illustrating a timing of a prefetch process in the data processor according to the third embodiment.

Next, a description will be given of an operation that data processor 300 uses predecoder 15 to stop the prefetch process. FIG. 12 is a timing chart for illustrating a timing of a prefetch process in data processor 300 according to the third embodiment. In the timing chart shown in FIG. 12, respective timings of a branch instruction, a branch target instruction, and a prefetch process are illustrated. The branch instruction and the branch target instruction each include an instruction fetch stage IF, an instruction decode stage D, and an execution stage r.

As shown in FIG. 12, CPU 1 performs, for the branch instruction and the branch target instruction, the instruction fetch stage IF in one clock cycle and the instruction decode stage D in one clock cycle. With no wait, CPU 1 performs the prefetch process of accessing memory 2 in one clock cycle. Then, in the instruction fetch stage IF, CPU 1 reads an instruction from instruction queue 11 into instruction decoder 12 and also outputs the instruction to predecoder 15.

Predecoder 15 makes a determination (branch determination) of whether or not the instruction (target instruction)

which is input in the instruction fetch stage IF is a branch instruction. When predecoder 15 determines that the instruction is the branch instruction, predecoder 15 stops, in the instruction decode stage D, the prefetch process for an instruction which is unnecessary to be executed. When the stop signal is "1", instruction fetch interface unit 14 outputs "0" as a request (IFREQ) to read from memory 2.

Figure 13:
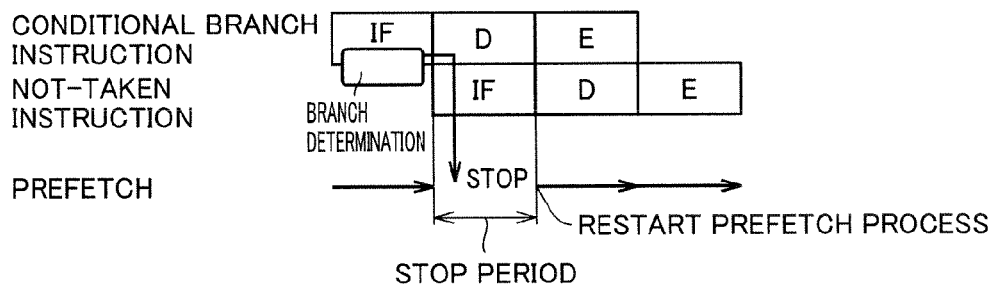
FIG. 13 is a timing chart for illustrating a timing of a prefetch process in the data processor according to the third embodiment in the case where a conditional branch instruction is executed.

Predecoder 15 can operate similarly for not only the branch instruction but also a conditional branch instruction. Specifically, FIG. 13 is a timing chart for illustrating a timing of a prefetch process in data processor 300 of the third embodiment in the case where a conditional branch instruction is executed. As shown in FIG. 13, CPU 1 performs, for the branch instruction and the branch target instruction, the instruction fetch stage IF in one clock cycle and the instruction decode stage D in one clock cycle. With no wait, CPU 1 performs the prefetch process of accessing memory 2 in one clock cycle. Then, CPU 1 reads, in the instruction fetch stage IF, an instruction from instruction queue 11 into instruction decoder 12, and also outputs the instruction to predecoder 15.

Predecoder 15 makes a determination (branch determination) of whether or not the instruction (target instruction) which is input in the instruction fetch stage IF is a conditional branch instruction. When predecoder 15 determines that the instruction is a conditional branch instruction, predecoder 15 stops, in the instruction decode stage D, a prefetch process for an instruction which is unnecessary to be executed. When the conditional branch target instruction is an instruction which is not branched (non-taken), CPU 1 restarts the prefetch process.

As seen from the foregoing, in data processor 300 of the third embodiment, predecoder 15 determines whether or not an instruction to be decoded next by instruction decoder 12 is a branch instruction. When the instruction is a branch instruction, predecoder 15 generates a stop signal for stopping a fetch process. Therefore, data processor 300 can stop the useless prefetch process of reading from memory 2 an instruction which is unnecessary to be executed. Further, data processor 300 stopping the useless prefetch process (access to memory 2) can thereby further reduce power consumption. In addition, in data processor 300, the instruction fetch can be started at the time when the branch instruction is started. Therefore, the problem of an increase of the number of clock cycles for executing the branch instruction due to the prefetch process can also be avoided.

When predecoder 15 determines that an instruction to be decoded next by instruction decoder 12 is an instruction (instruction to subtract for example) which requires more than one clock cycle for executing the instruction, predecoder 15 may still stop the prefetch process until execution of the instruction is completed.

While it has been described herein that data processor 300 has CPU 1 and memory 2 that are formed respectively on semiconductor substrates different from each other, CPU 1 and memory 2 may be formed on the same semiconductor substrate (one-chip semiconductor device). It should be noted that in the case where CPU 1 and memory 2 are formed on the same semiconductor substrate, data processor 300 does not have to be equipped with CPU interface 7 for connecting CPU 1 and memory 2 to each other.

Fourth Embodiment

Data processor 300 of the third embodiment has been described in connection with the case of the prefetch process of accessing memory 2 with no wait. The data processor, however, may perform the prefetch process with a-few-clock-cycles waiting for accessing memory 2. Accordingly, a data processor of a fourth embodiment will be described in connection with the case where the prefetch process is performed with a few clock cycles waiting for accessing memory 2. The data processor of the fourth embodiment is configured identically to data processor 300 of the third embodiment. Illustration of the data processor will therefore not be repeated and the same components are denoted by the same reference characters in the description.

Figure 14:
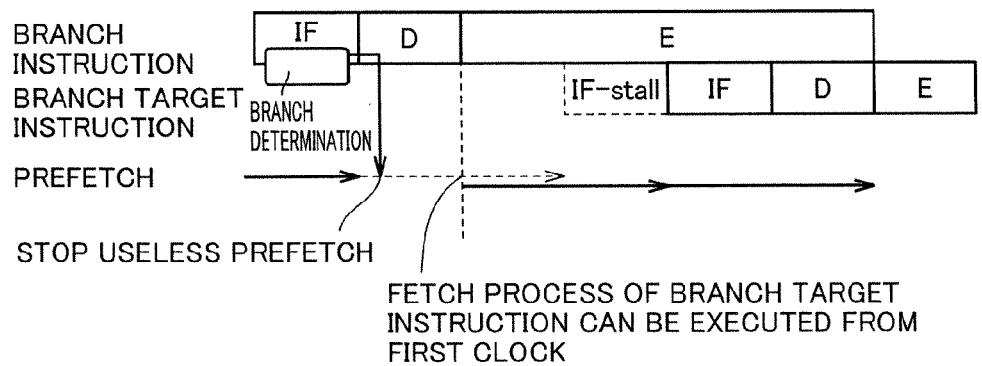
FIG. 14 is a timing chart for illustrating a timing of a prefetch process in a data processor according to a fourth embodiment.

FIG. 14 is a timing chart for illustrating a timing of a prefetch process in data processor 300 according to the fourth embodiment. In the timing chart shown in FIG. 14, respective timings of a branch instruction, a branch target instruction, and a prefetch process are illustrated. The branch instruction and the branch target instruction each include an instruction fetch stage IF, an instruction decode stage D, and an execution stage E.

As shown in FIG. 14, CPU 1 performs, for the branch instruction and the branch target instruction, the instruction fetch stage IF in one clock cycle and the instruction decode stage D in one clock cycle, and performs, after one-clock-cycle waiting, the prefetch process of accessing memory 2 in two clock cycles. Predecoder 15 makes a determination (branch determination) of whether or not an instruction (target instruction) which is input in the instruction fetch stage IF is a branch instruction. Therefore, even if CPU 1 is to start executing the prefetch process at the timing when the instruction decode stage D is started, CPU 1 stops the prefetch process when predecoder 15 deter mines that the instruction is the branch instruction.

Accordingly, CPU 1 can execute the prefetch process of the branch target instruction from the first clock cycle of the execution stage E, and can reduce to one clock cycle the period (IF-stall) in which execution of the instruction fetch stage IF of the branch target instruction is waited for. Further, the useless prefetch process which is started before the instruction decode stage D of the branch instruction can be stopped to thereby reduce useless accesses to memory 2 and reduce power consumption.

As seen from the foregoing, in data processor 300 of the fourth embodiment, even when memory 2 requires a predetermined wait period for an instruction to be read from the memory, predecoder 15 can stop the useless prefetch process so that the prefetch process can be executed from the first clock cycle of the execution stage E.

Fifth Embodiment

Data processors 300 of the third and fourth embodiments have been described in connection with the case where the instruction length is fixed. The data processors, however, are also applicable to the case where the instruction length is variable. Thus, a description will be given of a data processor of a fifth embodiment applied to the case where the instruction length is variable. The data processor of the fifth embodiment is configured identically to data processor 300 of the third embodiment. Illustration of the data processor will therefore not be repeated and the same components are denoted by the same reference characters in the description.

Figure 15:
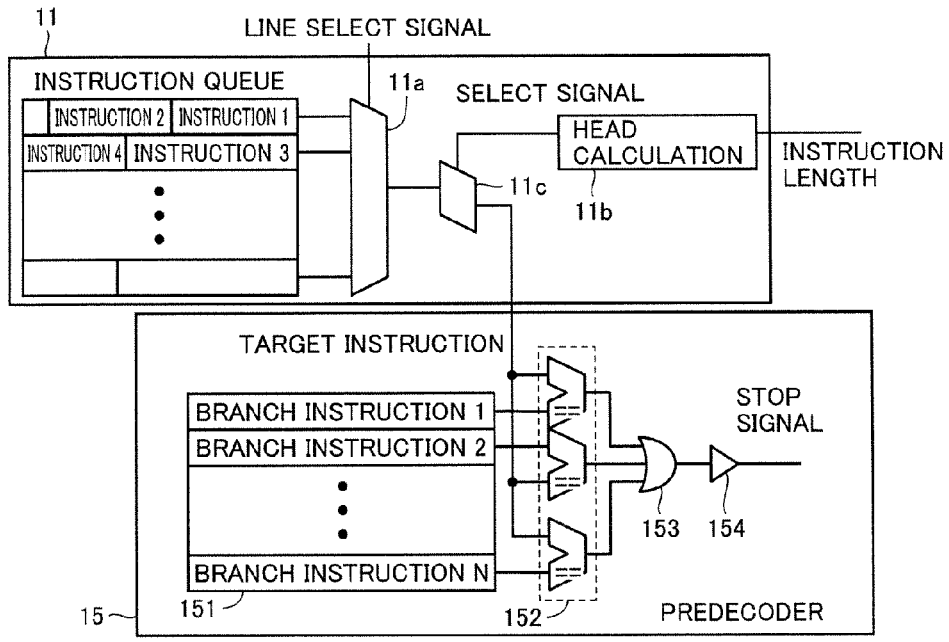
FIG. 15 is a block diagram showing a configuration of an instruction queue and a predecoder of a data processor according to a fifth embodiment.

Regarding data processor 300 of the fifth embodiment, the instruction length is variable, and therefore, this data processor is different from the above-described ones in terms of the configuration in which predecoder 15 reads an instruction (target instruction) from instruction queue 11. FIG. 15 is a block diagram showing a configuration of an instruction queue 11 and a predecoder 15 of data processor 300 according to the fifth embodiment. Like predecoder 15 shown in FIG. 11, predecoder 15 includes a storage unit 151, a comparison unit 152, and an operation unit 153.

Instruction queue 11 has a selector 11a, a head calculation unit 11b, and an instruction selector 11c. Instruction queue 11 stores variable-length instructions, and thus a line selected by selector 11a includes a plurality of instructions. Therefore, selector 11a reads a plurality of stored instructions line by line based on a line select signal, and outputs the read instructions to instruction selector 11c. Head calculation unit 11b calculates the head of an instruction to be executed next, from the instruction length of the instruction which is output from instruction decoder 12, and outputs the calculated head to instruction selector 11c. Based on the information indicating the head of the instruction which is output from head calculation unit 11b, instruction selector 11c selects an instruction to be executed next, from a plurality of instructions included in the line which is output from selector 11a, and outputs the selected instruction to comparison unit 152.

Comparison unit 152 compares the target instruction which is read from instruction queue 11 with a branch instruction (instruction for which stoppage is to be effected) which is stored in advance in storage unit 151. Operation unit 153 performs an operation on the result of a comparison between the target instruction and each branch instruction stored in storage unit 151 to thereby generate a stop signal. The stop signal generated by operation unit 153 is amplified to a predetermined voltage level by an amplifier 154 and output to instruction fetch interface unit 14.

As seen from the foregoing, regarding data processor 300 of the fifth embodiment in which the instruction length varies from instruction to instruction (the instruction length is variable), the instruction length which is obtained from the result of decoding of an instruction by instruction decoder 12 is used to select, from an instruction queue, an instruction to be decoded next, and read the selected instruction. Thus, the effects similar to those in the case where the instruction length is fixed can be obtained.

Modification

In the case where instruction queue 11 stores variable-length instructions and it takes a considerable time for instruction decoder 12 to decode an instruction and obtain the length of the instruction, predecoder 15 may not be able to perform the process of stopping a useless prefetch process. In view of this, a predecoder of a modification determines, for all of a plurality of instructions included in a line, whether or not each of the instructions is a branch instruction, as compared with a branch instruction (instruction for which stoppage is to be effected) stored in advance in the storage unit.

Figure 16:
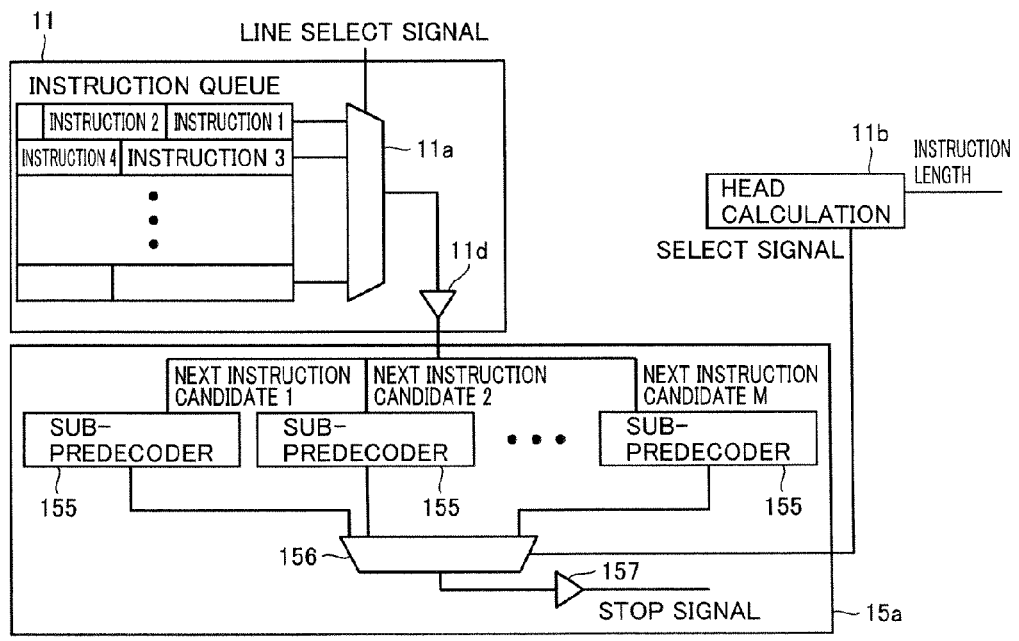
FIG. 16 is a block diagram showing a configuration of an instruction queue and a predecoder of a data processor according to a modification of the fifth embodiment.

FIG. 16 is a block diagram showing a configuration of an instruction queue 11 and a predecoder of a data processor 300 according to a modification of the fifth embodiment. Predecoder 15a includes a plurality of predecoders 15 shown in FIG. 11 as sub-predecoders 155. Thus, a plurality of sub-predecoders 155 determine, in parallel with each other, whether a plurality of instructions included in a read line are each a branch instruction or not. Specifically, in the case where the instructions included in the read line are Next Instruction Candidate 1 to Next Instruction Candidate M. M sub predecoders 155 are prepared that determine, in parallel with each other, whether or not instructions from Next Instruction Candidate 1 to Next Instruction Candidate M are each a branch instruction. Based on the information indicating the head of an instruction which is output from a head calculation unit 11b, a selector 156 selects one instruction from instructions from Next Instruction Candidate 1 to Next Instruction Candidate M, selects a stop signal generated by sub-predecoder 155 which has processed the selected instruction, and outputs the selected stop signal to instruction fetch interface unit 14.

The stop signal selected by selector 156 is amplified by an amplifier 157 to a predetermined voltage level, and output to instruction fetch interface unit 14. A plurality of instructions included in a line are provided to a plurality of sub-predecoders 155 and may therefore be amplified by an amplifier 11d to a predetermined voltage level.

As seen from the foregoing, data processor 300 in the modification of the fifth embodiment has a plurality of sub-predecoders 155 determining, in parallel with each other, whether or not a plurality of read instructions are each a branch instruction, and can thus stably perform a process of stopping the prefetch process.

Sixth Embodiment

A data processor of a sixth embodiment will now be described that is configured to be able to dynamically make a change, rather than stop the prefetch process as a result of determining all the time that all branch instructions (instructions for which stoppage is to be effected) stored in advance in storage unit 151 of predecoder 15 are branch instructions.

Figure 17:
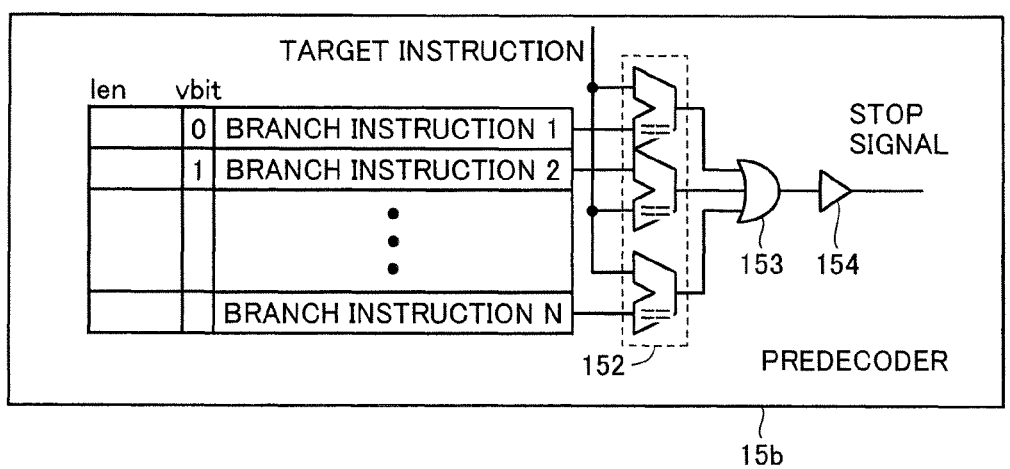
FIG. 17 is a block diagram showing a configuration of a predecoder of a data processor according to a sixth embodiment.

FIG. 17 is a block diagram showing a configuration of a predecoder of a data processor according to a sixth embodiment. The data processor of the sixth embodiment is configured identically to data processor 300 of the third embodiment. Illustration of the data processor will therefore not be repeated and the same components are denoted by the same reference characters in the description. In addition, the same component of predecoder 15b as that of predecoder 15 shown in FIG. 11 will be denoted by the same reference character and the detailed description thereof will not be repeated.

Predecoder 15b includes a storage unit 151a, a comparison unit 152, and an operation unit 153. Storage unit 151a stores in advance branch instructions (instructions for which stoppage is to be effected) for which the prefetch process has to be stopped, together with a valid bit Vbit based on which it is determined whether or not the prefetch process for each branch instruction is to be stopped, as well as length information len indicating the instruction length of each branch instruction. Storage unit 151b stores for example N branch instructions from branch instruction 1 to branch instruction N. Length information len is unnecessary in the case where the branch instruction has a fixed instruction length.

CPU 1 can use valid bit Vbit to thereby avoid, in the case where conditional branch instructions are consecutive instructions that are not taken (non-taken instructions), that the process of stopping the prefetch process is excessively performed which leads to lack of ability to provide instructions from instruction queue 11 to instruction decoder 12 and accordingly leads to deterioration of the performance.

Namely, CPU 1 writes "0" as valid bit Vbit of a branch instruction for which the process of stopping the prefetch process is unnecessary and accordingly does not perform the process of stopping the prefetch process. When "1" is written as valid bit Vbit, CPU 1 performs the process of stopping the prefetch process.

Figure 18:
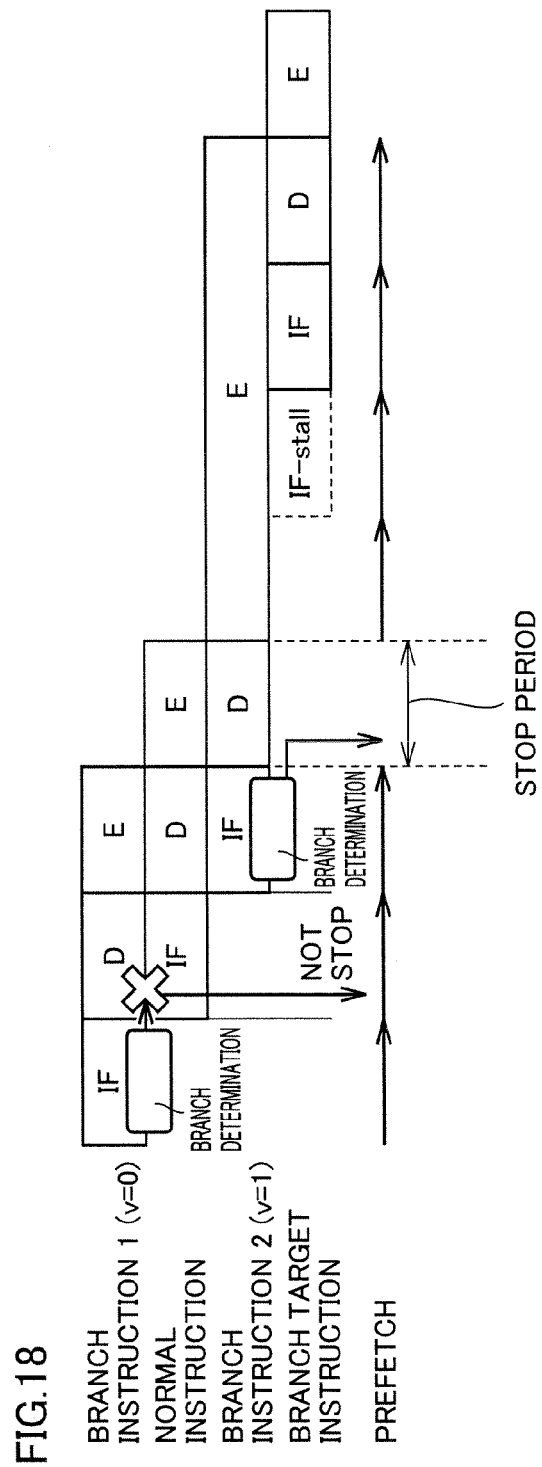
FIG. 18 is a timing chart for illustrating a timing of a prefetch process in the data processor according to the sixth embodiment.

FIG. 18 is a timing chart for illustrating a timing of a prefetch process in data processor 300 according to the sixth embodiment. The timing chart shown in FIG. 18 illustrates respective timings of a branch instruction 1, a normal instruction, a branch instruction 2, a branch target instruction, and a prefetch process. Branch instruction 1, the normal instruction, branch instruction 2, and the branch target instruction each include an instruction fetch stage IF, an instruction decode stage D, and an execution stage E.

CPU 1 performs, as shown in FIG. 18, the instruction fetch stage IF in one clock cycle and the instruction decode stage D in one clock cycle. With no wait, CPU 1 performs the prefetch process of accessing memory 2 in one clock cycle. Predecoder 15b makes a determination (branch determination) of whether or not an instruction (target instruction) which is input in the instruction fetch stage IF of branch instruction 1 is a branch instruction. Because "0" is written (v=0) as valid bit Vbit of branch instruction 1, predecoder 15b does not generate the stop signal stopping the prefetch process.

After this, CPU 1 executes the normal instruction and branch instruction 2. Predecoder 15b makes a determination (branch determination) of whether or not an instruction (target instruction) which is input in the instruction fetch stage IF of branch instruction 2 is a branch instruction. Because "1" is written (v=1) as valid hit Vbit of branch instruction 2, predecoder 15b generates the stop signal stopping the prefetch process. Thus, CPU 1 stops the prefetch process even if it is planned to start execution of the prefetch process at the timing when the instruction decode stage D is started.

CPU 1 can thereafter execute the prefetch process of the branch target instruction from the first clock cycle of the execution stage E, and reduce to one clock cycle the period (IF-stall) in which execution of the instruction fetch stage IF of the branch target instruction is waited for. The useless prefetch process started before the instruction decode stage D of branch instruction 2 can be stopped to thereby reduce unnecessary accesses to memory 2 and reduce power consumption. Further, the prefetch process of branch instruction 1 is not stopped while the prefetch process of branch instruction 2 is stopped, and accordingly it is prevented that the process of stopping the prefetch process is excessively performed.

As seen from the foregoing, regarding data processor 300 of the modification of the sixth embodiment, bit information (valid bit Vbit) following which the stop signal for stopping the fetch process is not generated even when it is determined that an instruction is a branch instruction, is added to each instruction for which stoppage is to be effected. Accordingly, data processor 300 in the modification of the sixth embodiment can prevent the process of stopping the prefetch process from being excessively performed and can avoid lack of ability to provide instructions and thus avoid deterioration of the performance.

Seventh Embodiment

Data processor 100 of the first embodiment has been described as being configured to stop access to memory 2 by means of stop unit 4 (fetch process control unit) provided outside CPU 1. Data processor 300 of the third embodiment has been described as being configured to stop access to memory 2 by means of predecoder 15 (fetch process control unit) provided inside CPU 1. A description will be given of a data processor of a seventh embodiment that is configured to stop access to memory 2 by means of a fetch process control unit which is a combination of the aforementioned fetch process control units of the first and third embodiments.

Figure 19:
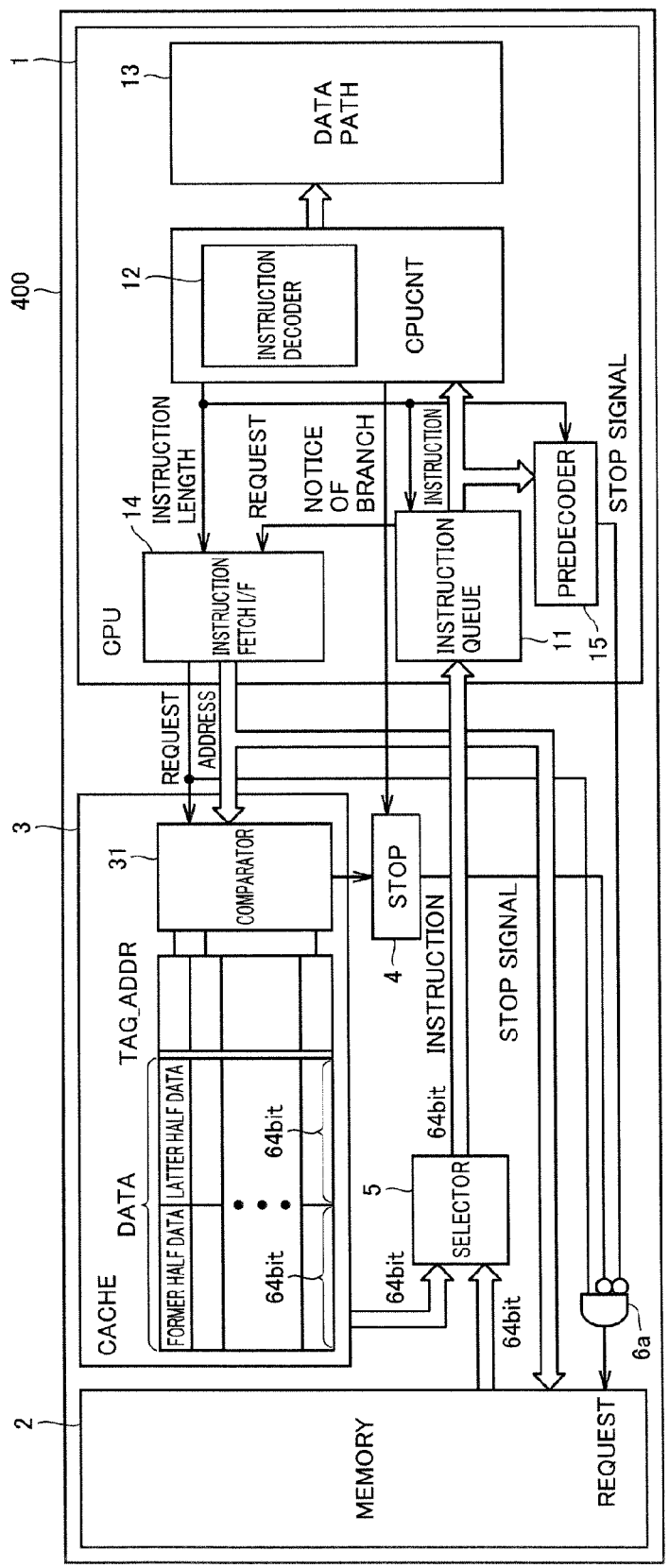
FIG. 19 is a block diagram showing a configuration of a data processor according to a seventh embodiment.

FIG. 19 is a block diagram showing a configuration of the data processor according to the seventh embodiment. Data processor 400 shown in FIG. 19 includes a CPU 1, a memory 2, an instruction cache 3, and a stop unit 4. CPU 1 accesses both memory 2 and instruction cache 3 to read an instruction from memory 2 or instruction cache 3 (fetch process). CPU 1 shown in FIG. 19 includes an instruction queue 11, an instruction decoder 12, a data path 13, an instruction fetch interface unit 14, and a predecoder 15.

The same component of data processor 400 of the seventh embodiment as those of data processor 100 of the first embodiment and data processor 300 of the third embodiment is denoted by the same reference character, and the detailed description thereof will not be repeated.

An operation of data processor 400 according to the seventh embodiment will now be described. FIG. 20 is a timing chart for illustrating the operation of data processor 400 of the seventh embodiment. The timing chart shown in FIG. 7 illustrates respective waveforms of the clock signal of CPU 1, an instruction fetch stage IF, an instruction decode stage D, an execution stage E, addresses to be read, a branch determination signal, a stop signal, a notice of branch, hit information, a hit quantity, and an access-to-memory 2 signal.

CPU 1 processes instructions in the order of "bra1", "sub", "bra2", "add", and "bra3" successively in a pipelined manner in each of the instruction fetch stage IF, the instruction decode stage D, and the execution stage E. For example, CPU 1 processes instruction "bra1" in a clock cycle in the instruction fetch stage IF, processes instruction "bra1" in the next clock cycle in the instruction decode stage D, and processes instruction "bra1" in the next clock cycle in the execution stage E.

When "bra1", "bra2", and "bra3" which are branch instructions are processed, predecoder 15 makes a branch determination in the instruction fetch stage IF, namely determines that the instruction is a branch instruction and accordingly sets the branch determination signal to "H" level. Further, as predecoder 15 sets the branch determination signal to "H" level, predecoder 15 sets the stop signal to "H" level at the timing of the next clock cycle and outputs the stop signal to memory 2.

Memory 2 receives the access-to-memory 2 signal, namely receives a signal representing the result of an AND operation performed by a processing unit 6a shown in FIG. 19 for inverse signals of the stop signal of stop unit 4 and that of predecoder 15 and the signal of the request from CPU 1. Specifically, when the signal of the request from CPU 1 is "H" level and the stop signal of predecoder 15 is "L" level, the access-to-memory 2 signal is "H" level. In contrast, when the stop signal of predecoder 15 is "H" level, the access-to-memory 2 signal is "L" level. As shown in FIG. 20, the access-to-memory 2 signal is "L" level at the timings (I, III) when the stop signal of predecoder 15 attains "H" level.

Before the instruction "bra1" is read from memory 2, instruction cache 3 stores the instruction "bra1" in the former half data and the instruction "sub" in the latter half data. When an address which is received from instruction fetch interface unit 14 matches the address of the instruction "bra1" stored in the former half data, comparator 31 determines that the instruction stored in the latter half data is "sub" based on the consecutiveness of the instructions. Comparator 31 thus outputs to stop unit 4 the hit information and a hit quantity of "2". Namely, as shown in FIG. 20, at the timing when the instruction "sub" is processed in the instruction fetch stage IF, the hit information attains "H"

level and the hit quantity is "2". Since the hit information is "H" level and the hit quantity is "2", the access-to-memory 2 signal attains "L" level at the timing of the next clock cycle (II).

As seen from the foregoing, data processor 400 of the seventh embodiment includes, as its fetch process control unit, stop unit 4 provided outside CPU 1 and predecoder 15 provided inside CPU 1. Therefore, data processor 400 of the seventh embodiment can stop access to memory 2 in at least one of the case where it is determined that instruction cache 3 stores an instruction of a branch target and the case where it is determined that the next instruction is a branch instruction. Accordingly, data processor 400 of the seventh embodiment can stop useless access to memory 2 and thereby further reduce power consumption.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 CPU; 2 memory; 3 instruction cache; 4 stop unit; 11a, 156 selector; 6, 6a processing unit; 7 CPU interface; 11 instruction queue; 11b head calculation unit; 11c instruction selector; 11d, 154, 157 amplifier; 12 instruction decoder; 13 data path; 14 instruction fetch interface unit; 15, 15a, 15b predecoder; 31, 31a comparator; 41 remaining stop quantity counter; 100, 200, 300, 400 data processor; 151, 151a, 151b storage unit; 152 comparison unit; 153 operation unit; 155 sub-predecoder; 311, 311a hit determination unit; 312, 312a hit quantity counter

The invention claimed is:

1. A data processor comprising:
a memory storing a program in which a plurality of instructions are written;
an instruction cache operating only when a branch instruction included in said program is executed, data of a greater capacity, than a width of a bus of said memory being read from said memory and stored in said instruction cache in advance;
a processing unit accessing both said memory and said instruction cache and executing, in a pipelined manner, instructions read from said memory or said instruction cache; and
a fetch process control unit generating, in response to a branch instruction executed by said processing unit, a stop signal for stopping a fetch process of reading an instruction from said memory, and outputting the stop signal to said memory;
wherein said processing unit includes:
an instruction queue in which an instruction read from said memo is stored in advance;
an instruction decoder successively reading instructions stored in said instruction queue and decoding the instructions;
an instruction execution unit executing the instructions decoded by said instruction decoder;
an instruction fetch interface unit outputting to said memory a request to read which is given from said instruction queue; and
a predecoder determining whether or not an instruction to be decoded next by said instruction decoder is a branch instruction and, when said instruction is the branch instruction, said predecoder generates a stop signal the stopping said fetch process and outputs the stop signal to said instruction fetch interface unit, and
said fetch process control unit is said predecoder;
wherein said predecoder determines whether or not an instruction is a branch instruction by comparing an instruction to be decoded next by said instruction decoder with an instruction for which stoppage is to be effected and which is stored in advance; and
wherein said predecoder adds bit information to each said instruction for which stoppage is to be effected, said bit information causing a stop signal for stopping said fetch process not to be generated even when said predecoder determines that the instruction to be decoded next is a branch instruction.

2. The data processor according to claim 1, wherein said instruction cache includes a comparator comparing, when the branch instruction is executed by said processing unit, an address in said memory to be accessed with an address of an instruction stored in advance in said instruction cache and, when these addresses match each other, said comparator determines that said instruction cache stores an instruction of a branch target for said branch instruction, and
said fetch process control unit is a stop unit generating, when said comparator determines that said instruction cache stores the instruction of the branch target, a stop signal for stopping said fetch process and outputting the stop signal to said memory, during a period in which the instruction stored in said instruction cache is read.

3. The data processor according to claim 2, wherein when said addresses match each other, said comparator counts a hit quantity representing the number of times instructions stored in said instruction cache can be read, and
said stop unit includes a counter setting said hit quantity to an initial value and counting down said hit quantity to set a period in which access to said memory is stopped.

4. The data processor according to claim 2, wherein when the instruction of the branch target is followed by a further branch, said stop unit cancels stoppage of access to said memory.

5. The data processor according to claim 2, wherein said instruction cache has a capacity of N times as large as the width of the bus of said memory, and
said stop unit stops access to said memory N−1 times at a maximum.

6. The data processor according to claim 1, wherein after stopping said fetch process, said predecoder restarts said fetch process when the instruction determined to be the branch instruction is executed by said instruction execution unit.

7. The data processor according to claim 1, wherein an instruction length varies from instruction to instruction, and
said predecoder selects and reads from said instruction queue an instruction to be decoded next, based on an instruction length obtained from a result of decoding of an instruction by said instruction decoder.

8. The data processor according to claim 7, wherein said predecoder includes a plurality of sub-predecoders determining, in parallel with each other, whether a plurality of read instructions are each a branch instruction or not.

9. The data processor according to claim 1, wherein said memory requires a predetermined wait period for an instruction to be read.

\* \* \* \* \*